July 17, 1962  L. KLUCK  3,044,554
CASING CENTRALIZER
Filed Feb. 13, 1959  2 Sheets-Sheet 1
Fig. 1
Fig. 2
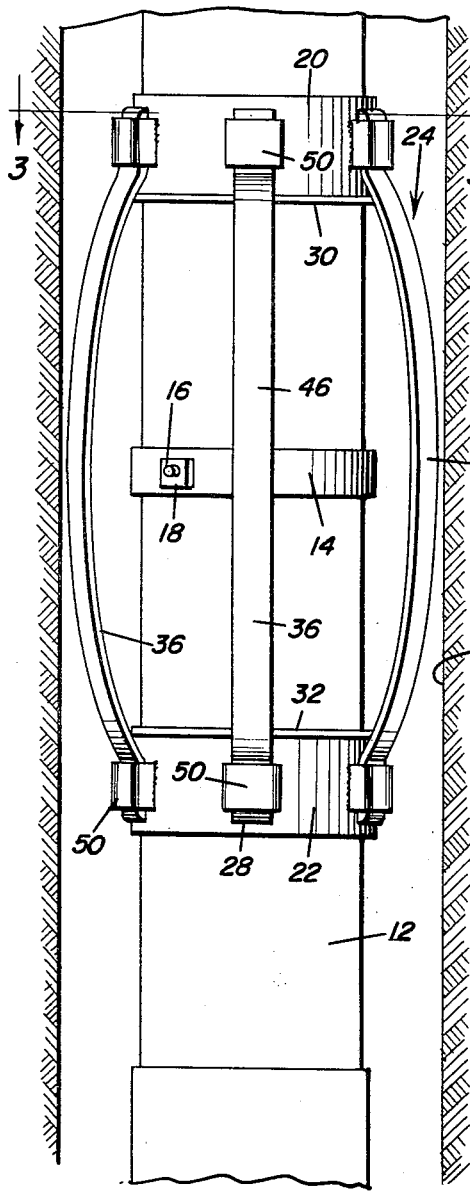
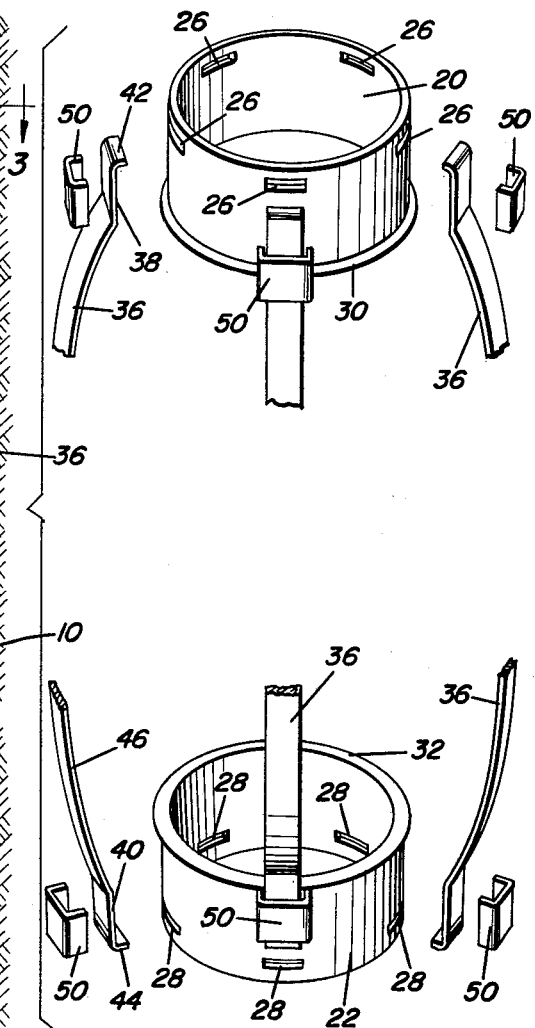
Louis Kluck
INVENTOR.
BY Clarence A. O'Brien
and Harvey B. Jacobson
Attorneys July 17, 1962 L. KLUCK 3,044,554
CASING CENTRALIZER
Filed Feb. 13, 1959 2 Sheets-Sheet 2

Louis Kluck
INVENTOR.

United States Patent Office 3,044,554
Patented July 17, 1962

3,044,554
CASING CENTRALIZER
Louis Kluck, Box 1421, Odessa, Tex.
Filed Feb. 13, 1959, Ser. No. 793,022
1 Claim. (Cl. 166—241)

This invention relates to casing centralizers and more particularly, improvements in the centralizers such as disclosed in my prior Patent No. 2,636,564.

An object of the invention is to provide a centralizer of the type which has a plurality of leaf springs, with means for originally adjusting the tension of the springs to assure that the centralizer will serve its intended function effectively.

Another object of the invention is to provide a materially simplified casing centralizer of the general type disclosed in the above referenced patent, eliminating the ribs which connect the upper and lower rings of the centralizer and without any ostensible loss of function thereof due to the new spring adjustment technique. In adjusting the springs in accordance with this invention, they are positioned so that the ends lock in circumferential slots in the upper and lower rings and then spring clips are applied over the leaf springs in selected positions lengthwise of the leaf springs. The springs and clips are welded in place so that a rigid connection exists between the ends of the springs and the upper and lower rings but yet, the tension of the springs is originally altered in accordance with the position of the spring clip.

Another object of the invention is to provide outwardly extending ridges which are on the adjacent ends of the rings to furnish a reaction point against which the springs bear when they are deflected in moving down the shaft with the well casing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a longitudinal sectional view of the typical shaft accommodating a portion of a well casing on which the centralizer is mounted.

FIGURE 2 is a fragmentary exploded perspective view of the centralizer.

Figure 3:
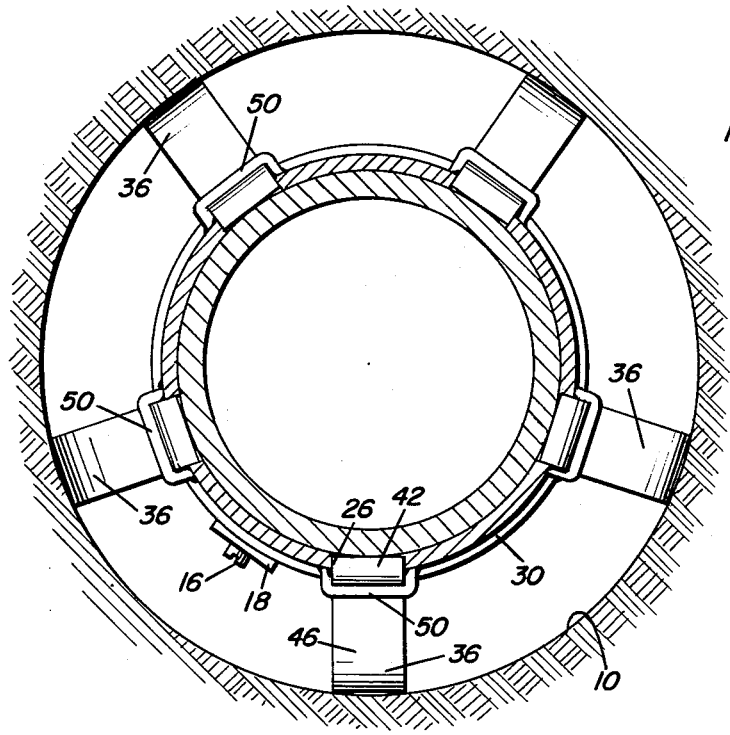
FIGURE 3 is an enlarged sectional view taken on the line 3—3 of FIGURE 1.
Figure 4:
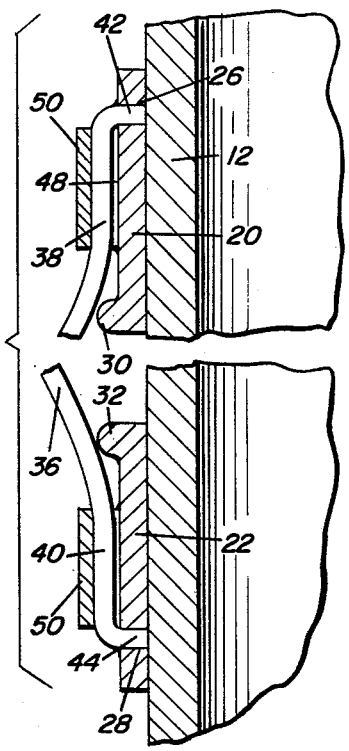
FIGURE 4 is an enlarged sectional detail view showing the connection of the springs and spring clips with the upper and lower rings and the arrangement of outwardly directed ridges at the adjacent ends of the upper and lower rings respectively.

In the accompanying drawings there is illustrated an ordinary borehole 10 within which well casing 12 is disposed. A band 14 is mounted on casing 12 and held in a selected adjusted position by one or more set-screws 16 passed through a corresponding number of nuts 18 welded on band 14 in alignment with apertures in the band. The band may be placed along the length of well casing 12 but is preferably located between the upper and lower rings 20 and 22 of centralizer 24 to limit longitudinal movement of the latter relative to the casing 12. The rings are made of short metal sleeves, and each ring is identical and slidably disposed on the casing 12. Ring 20 has a plurality of circumferentially spaced slots 26 near its upper edge, while ring 22 has a plurality of circumferentially spaced slots 28 near its lower edge. The confronting edges of rings 20 and 22 have circumferential outwardly extending ridges 30 and 32 that serve as stops for the elongate leaf springs 36. The springs 36 are identical in length, configuration and inherent resilience and each has an upper flat portion 38, a lower flat portion 40, an upper inwardly directed flange 42 and a lower inwardly directed flange 44. A smooth curved bow 46 in the spring connects portions 38 and 40. Flanges 42 and 44 of each spring 36 engage in corresponding slots 26 and 28 in the upper and lower collars or rings 20 and 22 respectively. The flat portions 38 and 40 are maintained essentially parallel to the outer surfaces of the rings 20 and 22, and there is a slight clearance 48 between the flat portions and the outer surface of the rings 20 and 22 to enable the flexing of the springs 36 to be distributed over a greater length of the springs thereby reducing the possibility of one or more springs breaking due to metal fatigue. (FIGURE 4.)

There are a plurality of spring retainers or clips 50, each of which is substantially U-shaped in cross-section and of sufficient depth to fit over one flattened end 38 or 40 of each spring. Two spring clips are required for each spring, and they form saddles embracing the flattened ends of the leaf springs.

In assembly, rings 20 and 22 are spaced apart a distance to receive flanges 42 and 44 in their slots 26 and 28. The tension of each leaf spring is selected by placing the clips 50 in a selected position along the length of the leaf spring with which it is associated and welding it in place. By placing the clips of each spring farther apart, the space between the springs and the ridges 30 and 32 enables the springs to flex more freely. By placing the clips closer together, the springs contact the ridges 30 and 32 and the ridges comprise abutments reducing the length of the springs which may be freely flexed thereby causing the springs to be more rigid and offer greater resistance to flexing. The flanges 44 are also welded in the slots 28, and flanges 42 are welded in slots 26 thereby forming a unitary construction of the centralizer.

In use, the selection of spring tension for springs 36 enables the centralizer to resiliently urge the casing 12 to a centrally disposed position in the borehole 10 with a selected resistance to lateral deflection when the leaf springs press against the inside surface of the borehole 10 as drill casing 12 moves from the center line of the borehole 10. Ridges 30 and 32 intimately coact with the adjustment of the spring tension by furnishing abutments (FIGURE 4) against which the springs press when they are deflected inwardly of the drill casing 12. With clips 50 close to the abutment formed by ridges 30 and 32, the effective length of the spring curvature is altered by having the spring inner surface contact ridges 30 and 32 in response to a greater or smaller amount of spring deflection.

Figure 5:
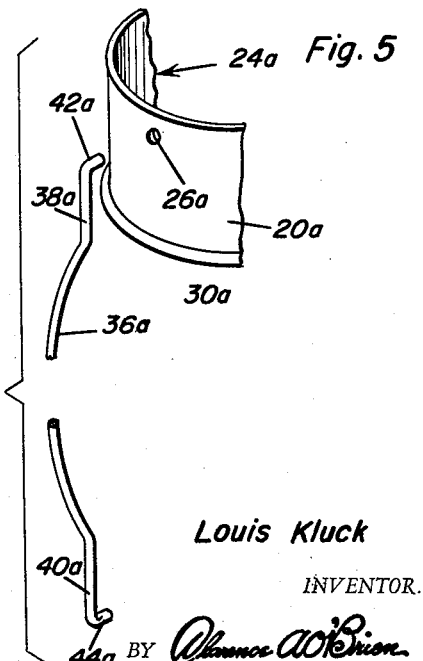
FIGURE 5 is a fragmentary exploded perspective view of a modification.

FIGURE 5 shows a modification of the centralizer. Centralizer 24a of FIGURE 5 has a pair of rings, only the upper ring 20a being illustrated. This ring has lower ridge 30a together wtih one leaf spring 36a. The leaf spring has portions 38a, 40a, 42a and 44a, respectively which respond in function to the corresponding portions of spring 36. The only difference is that spring 36a has a circular cross-section instead of a flat cross-section as spring 36. Further, since the cross-section of spring 36a is circular, slot 26a in ring 20a is circular to accommodate flange 42a. The spring clips corresponding to spring clips 50 may have the same cross-sectional shape as spring clips 50. It is noted that the spring clips 50 may be omitted in FIGURE 5 and the same holds true in the embodiment of FIGURE 1 but with the attendant loss of function thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A centralizer for a drill casing, said centralizer comprising an upper ring and a lower ring, said rings each adapted to be slidably disposed over a casing section, a plurality of leaf springs attached at their upper and lower ends to said upper and lower rings respectively, each leaf spring having a bow intermediate its ends and projecting outwardly from the drill casing, spring clips secured rigidly in a selected position along the length of said springs and to said upper and lower rings respectively, said spring clips constituting nests within which the ends of said springs are disposed and constituting means by which to select and fix the selective resilience of the springs, abutments on said upper and lower rings respectively and protruding laterally outwardly from said rings, said abutments contacted by portions of said springs when said springs are deflected inwardly of said rings to thereby alter the effective length of the springs as they are deflected inwardly toward said rings and the well casing, each spring having essentially flat portions at the ends of the bow which are nested within said spring clips, and the inner surfaces of said portions and the outer surfaces of said rings having a clearance therebetween, inwardly directed extremities on said springs, and said upper and lower rings having apertures within which said extremities of said springs are disposed and held fixed with respect to said rings.

References Cited in the file of this patent
UNITED STATES PATENTS

| | | |
|---|---|---|
| 2,636,564 | Kluck | Apr. 28, 1953 |
| 2,680,488 | Atkinson | June 8, 1954 |
| 2,727,576 | Hall | Dec. 20, 1955 |